Aug. 4, 1964
R. G. HOEY
3,142,977
METHOD FOR READING OSCILLOGRAPH TRACE
Filed May 6, 1960
3 Sheets-Sheet 1
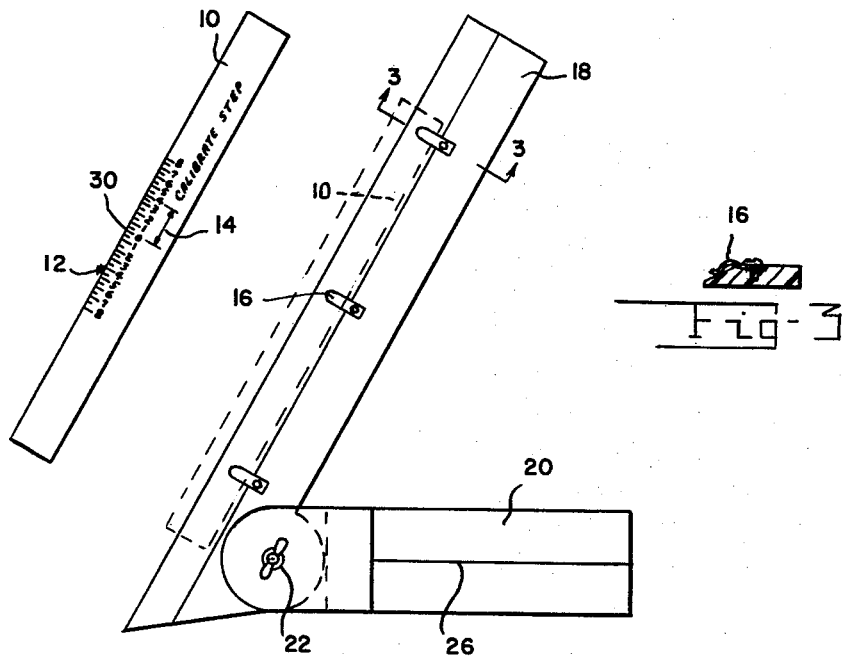
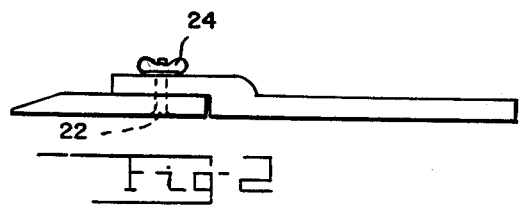
INVENTOR.
ROBERT G. HOEY
BY
ATTORNEYS Aug. 4, 1964     R. G. HOEY     3,142,977
METHOD FOR READING OSCILLOGRAPH TRACE
Filed May 6, 1960     3 Sheets-Sheet 3

INVENTOR.
ROBERT G. HOEY
BY
ATTORNEYS

United States Patent Office 3,142,977
Patented Aug. 4, 1964

3,142,977
METHOD FOR READING OSCILLOGRAPH TRACE
Robert G. Hoey, 1353 W. Kildare, Lancaster, Calif.
Filed May 6, 1960, Ser. No. 27,456
2 Claims. (Cl. 73—1)
(Granted under Title 35, U.S. Code (1952), sec. 266)

The invention described herein may be manufactured and used by or for the United States Government for governmental purposes without payment to me of any royalty thereon.

This invention relates to a portable measuring device for hand reading of oscillograph paper and, more particularly, to a highly simplified device which incorporates the capabilities of more complicated devices.

The device of the invention incorporates an angular adjustment of a pair of arms and the laws relating to similar triangles, to provide what might be termed an elastic scale for correcting a previously established calibrated scale to a set of changed voltage conditions, which, in more complicated devices, is handled as a constant in a mathematical equation. The device is also equipped with a calibrated scale which is physically movable along a reading arm to correct for changes in zero position. Methods now available for obtaining similar data involve the solving of a mathematical equation which includes the magnitude of the trace deflection, the calibration constant noted above, the zero positions and in the present application it would involve also the difference in in-flight voltage when the trace was made and the preflight voltage when the calibration run was made. The present specific application of the invention deals with making a device for reading trace which has been made for the purpose of detecting flutter or undesirable oscillation or movement of an airplane rudder, stabilizer or other aileron element. In this process, a preflight ground calibration run is made wherein a known resistance is introduced for a short interval, and later the same known resistance is introduced for a short interval during the in-flight test, and a measure of differing voltage conditions during the two runs is thus achieved.

Complicated equipment, such as the Benson Lehner "Oscar" have been devised to accomplish this computation process automatically. Such devices are expensive mechanically and electrically intricate and require trained operators. In many situations they are inaccessible.

The present invention incorporates the method of the complicated "Oscar" in a sturdily built and durable hand reader which makes use of the adjustable angular relationship of a pair of arms provided what might be termed an elastic scale to account for and cancel out voltage differences between the voltage conditions under which a calibration scale is made and the actual conditions prevailing when the trace was made. The device also provides a calibrated scale which is physically movable to adjust to changes in zero position.

Such hand reading devices are now available for making oscillograph trace readings are devices adapted for use only with specific types of traces such as spectrometric curves, siesmographs, etc.

While universally adaptable for the reading of any sort of oscillograph trace, the accommodation for voltage differences in the making and reading of all types of oscillograph trace, the present invention was devised in operations connected with the detection of vibration and unwanted movement in aircraft aileron elements including stabilizers and rudders, and the detection of fatigue and hazardous conditions which are detectable in undue vibration of rudder and stabilizer elements.

The reading device eliminates the possibility of mathematical errors associated with the mathematical computations noted above, besides providing obvious saving of time. It produces accurate results for either linear or nonlinear calibrations. It is inexpensive and, since it is made from noncorrosive materials, is durable and not subject to inaccuracies incurred by corrosion. Since it involves no complicated electronic or mechanical machinery and, since the mathematical calculations are "built in," acurate results can be obtained by untrained personnel. It is a compact and easily transported tool.

The device provides a calibrated scale, which, although differing in unit magnitude from the quantity to be measured, nevertheless is rendered usable for taking correct readings. It has a movable scale to deal with changes in zero position.

In the drawing, FIG. 1 is a plan view of the device, showing the movable scale in full lines unattached and separated from the reader, and in dotted lines clipped to the reader.

FIG. 2 is an edge elevation, and

FIG. 3 is a cross section taken on the line 3—3 of FIG. 1, and

Figure 4:
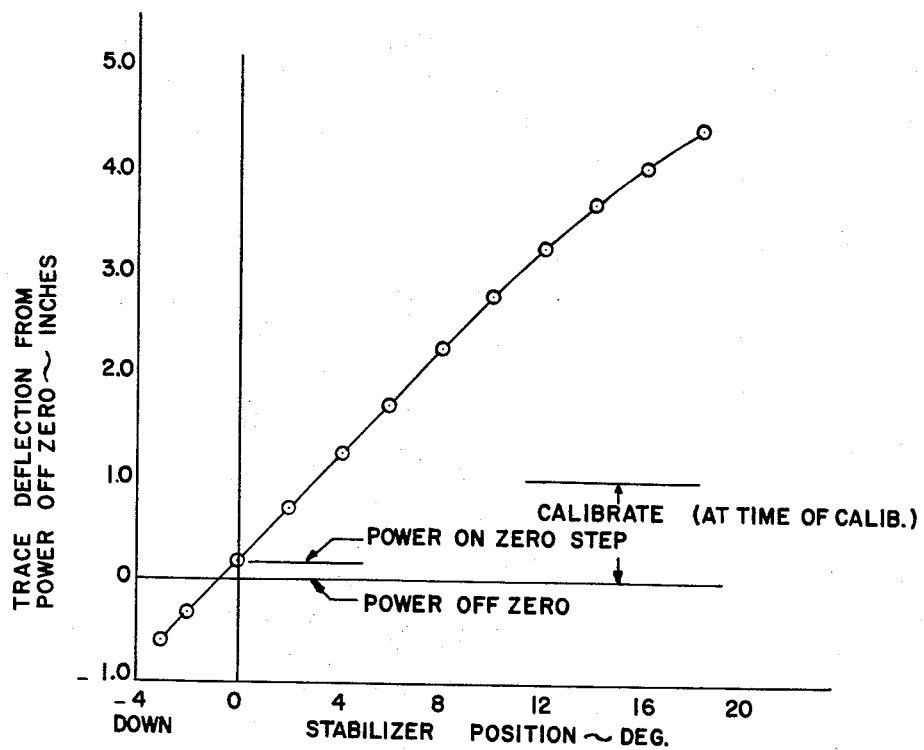
FIG. 4 is a plotted line containing the information obtained during the calibration process.

Referring more in detail to the drawing, a calibration card is indicated by the numeral 10. A calibrated scale 12 is carried on the calibration card 10. The card 10 also carries a "calibrate" step indicated by an arrow and designated by the numeral 14.

The calibration card 10 is attachable by means of steel spring clips or other expedient attaching means so that it is movable along a reading arm 18. The reading arm 18 and a reference arm 20 are pivotally attached to each other by means of a pin 22 and adjustable wing nut 24 or other suitable adjustable pivot means to provide for angular adjustment, and are made of plexiglass or other noncorrodable and, preferably, transparent material. The arm 20 is provided with a scribe line 26, etched, or otherwise applied to the underneath surface of the arm 20, so that it can be made to coincide with the reference trace of oscillograph trace paper.

As is well known, an oscillograph "trace" is made by moving a strip of paper or film at a constant rate past a marking device, which moves in response to changes in resistance introduced into a circuit caused by, in the present example, vibrations in a rudder or stabilizer. With constant voltage, the variations in the trace will be proportional to the vibration in the aileron element. When a calibration scale is made, a magnitude of voltage may be used from which the in-flight voltage may vary. Before the data system can be used, some type of calibration must be made to establish the amount of trace deflection which will correspond to this known variation.

Many techniques are used to obtain such a calibration, varying with the type of measurement being made. The following example is given to show how a calibration scale is made, and how the magnitude of the automatic calibrate step which appears on the calibration card is determined. The example used is a stabilizer position.

A ground test is made, wherein the stabilizer, whose vibration is to be measured, is set at various known positions, and a short oscillograph record made at each of these positions. The information obtained is read and plotted as rudder position in degrees, vs. trace deflection or rudder flutter in inches. A line is drawn through the calibration points as indicated in FIG. 4, and the points read are transferred to a calibration card. The values of rudder deflection may, however, be transferred directly to the card. The rudder positions chosen for the specific examples shown in FIG. 4 are 2°, 4°, 6°, 8°, etc., and the rudder movement at each of these positions is measured and plotted. For example, at a stabilizer position of 8°, the deflection was found to be 2¼ inches. A calibration card is made on the ground in this manner for each in-flight trace made. A calibrate step, representing the source voltage during a short interval or calibrate cycle with the introduction of a known resistance, is also placed upon the calibration card to become a means of automatically making computations by means of the law of similar triangles, for cancelling out differences in voltage during the calibration run, and the actual in-flight voltage. This calibrate step represents the voltage used at the time the calibration was made. It must be made oversize. It can be likened to the stretched limit of an elastic ruler capable of being reduced in size for making the necessary comparison with an in-flight calibrate step. The in-flight step is determined by introducing a known resistance for a short interval or calibrate cycle shown at M–N in FIG. 5 wherein the same known resistance used for determination of the ground calibrate step is introduced.

Since the resistance at the time of the determination of the calibrate step in each case is a known resistance and remains constant, the height of the calibrate step in each case is proportional to the applied voltage in each case and therefore provides a direct measure of comparison of the voltage variation. The in-flight calibrate step will now function as a leg of a right triangle whose hypotenuse is the ground calibrate step (see FIG. 5).

For example: If an in-flight calibrate step measured only ¾ the height of the calibrate step, then the voltage indicated by the calibrate scale is only ¾ of the actual in-flight voltage. The angular adjustment of the two arms 18 and 20 of the oscillograph reader will dampen out this difference. The reading arm 18 and the reference arm 20 will be adjusted at an angle such that the vertical height of the calibrate step marked on the calibration card will match the height of the in-flight calibrate step recorded on the trace. As a result, the entire vertical scale of the card will be reduced by the correct amount, and the scale on the card becomes a usable measure of deflection of any point on the trace.

Figure 5:
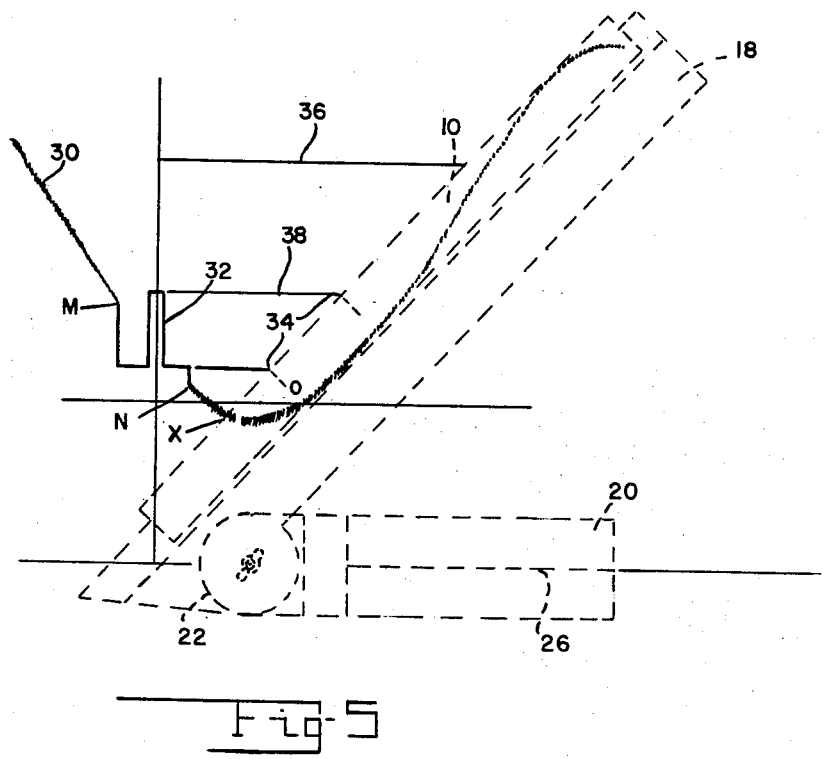
FIG. 5 shows a dotted line view of the device applied to read a point on a typical in-flight oscillograph trace made in in-flight test.

A point X on a trace 30, see FIG. 5 may be read by utilizing the following steps:

(1) Slide the calibration card 10 under the clips 16 on the arm 18.

(2) Align the calibrate step on the card with the in-flight calibrate step on the trace. Do this by obtaining coincidence of the lowermost point of each calibrate step and rotating the reading arm. By keeping the scribed line 26 of the reference arm parallel to the reference trace 36 on the oscillograph paper, an angle is determined. The preflight calibrate step will now form the hypotenuse 34 of a right triangle, whose vertical leg 32 will be the in-flight calibrate step. When the points are so aligned, tighten the wing nut 24.

(3) Now align the scribed line with the reference trace and slide the calibration card along the reading arm until the zero position on the card (or power-off zero mark if unbalanced) is aligned with the power off zero on the rudder trace.

(4) The angular adjustment of the device has now been determined and has become an incorporated characteristic of the tool. In like manner, the zero position has been made.

(5) The oscillograph reader is now adjusted so that any point on the curve may be correctly read by aligning the reference trace with the scribed line on the reference arm, sliding the reader to the right or left to find the point on the curve, as for example, point X in FIG. 5, and reading the final values on the calibration card.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. The method of making a device for point reading of specific oscillograph trace recording of in-flight aileron flutter, said method comprising, making a series of ground runs at different positions of said aileron and transferring the aileron deflection readings for each aileron position to a calibration card, determining an on-the-ground calibrate step and an in-flight calibrate step by introducing an identical known resistance into an on-the-ground run and the in-flight test run for a short interval and determining the aileron deflection in each case to become the calibrate step in each case, aligning the ground calibrate step with the in-flight calibrate step by obtaining coincidence of their lower points and rotating the card about these lower points as a center until the ground calibrate step has become the hypotenuse of a right triangle one of whose legs is the in-flight calibrate step, adjusting arm elements to incorporate the angles so determined, thus producing a point-reading device effective for reading all points on the individual trace for which it was made.

2. The method of damping out voltage differences for the purposes of oscillograph reading of rudder deflection trace which comprises making an on-the-ground calibration scale and an on-the-ground calibrate step, making an in-flight calibrate step wherein the conditions of the calibration and the in-flight trace differ only in voltage variation, damping out this difference by an angular adjustment and a comparison of the calibrate step and in-flight step by means of similar triangles wherein the ground and in-flight calibrate steps become the hypotenuse and one leg respectively of a right triangle to render the calibration scale usable for all the points on the trace.

References Cited in the file of this patent
UNITED STATES PATENTS

| | | |
|---|---|---|
| 81,720 | Williams | Sept. 1, 1868 |
| 1,057,852 | Kohler | Apr. 1, 1913 |
| 1,091,461 | Russo | Mar. 24, 1914 |
| 2,458,054 | Brown | Jan. 4, 1949 |
| 2,524,790 | Grunwald | Oct. 10, 1950 |